United States Patent [19]

Rumpf et al.

[11] Patent Number: 5,030,603
[45] Date of Patent: Jul. 9, 1991

[54] LIGHTWEIGHT OIL AND GAS WELL PROPPANTS

[75] Inventors: David S. Rumpf, North Tonawanda, N.Y.; Paul R. Lemieux, Forth Smith, Ark.

[73] Assignee: Norton-Alcoa, Ft. Smith, Ark.

[21] Appl. No.: 483,256

[22] Filed: Feb. 21, 1990

Related U.S. Application Data

[60] Division of Ser. No. 297,877, Jan. 17, 1989, Pat. No. 4,921,821, which is a continuation-in-part of Ser. No. 277,258, Aug. 2, 1988, abandoned.

[51] Int. Cl.$^5$ .............................................. C04B 35/10
[52] U.S. Cl. ................... 501/127; 501/128; 501/133; 501/144; 166/280
[58] Field of Search ............... 501/127, 128, 133, 144; 166/280

[56] References Cited

U.S. PATENT DOCUMENTS

| | | | |
|---|---|---|---|
| 2,950,247 | 8/1960 | McGuire | 252/8.55 |
| 3,245,866 | 4/1966 | Schott | 161/168 |
| 3,437,148 | 4/1969 | Colpoys | 166/308 |
| 3,486,706 | 12/1969 | Weyand . | |
| 3,976,138 | 8/1976 | Colpoys | 166/280 |
| 4,068,718 | 1/1978 | Cooke et al. | 166/280 |
| 4,427,068 | 1/1984 | Fitzgibbon | 166/280 |
| 4,462,466 | 7/1984 | Kachnik | 166/280 |
| 4,493,875 | 1/1985 | Beck et al. | 428/403 |
| 4,522,731 | 6/1985 | Lunghofer | 252/8.55 |
| 4,547,468 | 10/1985 | Jones et al. | 501/33 |
| 4,555,493 | 11/1985 | Watson et al. | 501/127 |
| 4,632,876 | 12/1986 | Laird et al. | 428/404 |
| 4,658,899 | 4/1987 | Fitzgibbon | 166/280 |
| 4,668,645 | 5/1987 | Khaund | 501/127 |
| 4,680,230 | 7/1987 | Gibb et al. | 428/403 |
| 4,713,203 | 12/1987 | Andrews | 264/117 |
| 4,921,820 | 5/1990 | Rumpf et al. | 501/144 X |

FOREIGN PATENT DOCUMENTS

| | | | |
|---|---|---|---|
| 101855 | 3/1984 | European Pat. Off. | 43/267 |
| 116369 | 8/1984 | European Pat. Off. | 43/267 |
| 169412 | 1/1986 | European Pat. Off. | 35/18 |
| 8503327 | 8/1985 | PCT Int'l Appl. | 43/267 |

*Primary Examiner*—Karl Group
*Attorney, Agent, or Firm*—Weil, Gotshal & Manges

[57] ABSTRACT

A lightweight oil and gas well proppant made by simultaneously mixing and compacting a milled calcined kaolin clay powder to form green pellets and then drying, screening and sintering the pellets to form proppant pellets having a specific gravity of 3.0 or less and a conductivity of at least 4,200 millidarci-feet and preferably at least 5,100 md-ft as measured by the Stim-Lab method after 50 hours at 8,000 psi and 275° F. in the presence of deoxygenated aqueous 2% solution of KCl.

20 Claims, No Drawings

LIGHTWEIGHT OIL AND GAS WELL PROPPANTS

This application is a division of application Ser. No. 07/297,877, filed Jan. 17, 1989, now U.S. Pat. No. 4,921,821 which, in turn, is a continuation-in-part of application Ser. No. 07/277,258, filed Aug. 2, 1988, now abandoned.

FIELD OF INVENTION

This invention relates generally to lightweight proppants for oil and gas wells and more particularly to lightweight proppants for oil and gas wells having increased strength and conductivity.

BACKGROUND

Hydraulic fracturing is a process of injecting fluids into a selected oil or gas bearing subsurface earth formation traversed by a well bore at sufficiently high rates and pressures such that the formation fails in tension and fractures to accept the fluid. In order to hold the fracture open once the fracturing pressure is released a propping agent (proppant) is mixed with the fluid which is injected into the formation.

Hydraulic fracturing increases the flow of fluids from an oil or gas reservoir to a well bore in at least three ways: (1) the overall reservoir area in communication with the well bore is increased, (2) the proppant in the fracture generally has significantly higher permeability than that of the formation, thereby allowing fluids to flow more easily, and (3) the high conductivity channel causes large pressure gradients to be created in the reservoir past the tip of the fracture.

Proppants are generally strong, preferably substantially spherical, particulates that should be able to withstand the high temperatures and pressures and corrosive environments experienced in the subsurface formations surrounding an oil or gas well. Early proppants were formed of material such as glass beads, sand, walnut shells and aluminum pellets. These materials did not have sufficient strength or resistance to corrosion to be successful in many wells, particularly where closure pressures above a few thousand psi were experienced.

U.S. Pat. No. 4,068,718 to Cooke relates to a proppant which Cooke states is formed of "sintered bauxite" that has a specific gravity greater than 3.4. Cooke states that specific gravities above 3.4 are required in order that the proppant have sufficient compressive strength to resist fragmentation under the high stress levels experienced in use. While the proppant described in Cooke's example proved to have sufficient strength to resist crushing, the high specific gravity was undesirable since it required the use of higher viscosity fracturing fluids and resulted in a lower volumetric proppant concentration for a given weight of proppant loading in a fracturing fluid when compared with that achieved by a proppant of lower specific gravity In general, the higher the volumetric concentration of the proppant in the fracturing fluid the wider the propped fracture will be after the fracturing pressure is released.

U.S. Pat. No. 4,427,068 to Fitzgibbon relates to intermediate strength composite proppants made by mixing calcined diaspore clay, burley clay or flint clay with alumina, "bauxite" or mixtures thereof such that the ratio of alumina to silica in the composite mix is between nine to one and one to one. The powdered starting materials are mixed in an Eirich mixer and while the mixing is in progress sufficient water is added to cause formation of composite spherical pellets from the powdered mixture. Fitzgibbon states that the rate of water addition is not critical. The pellets are dried and then furnaced to sinter the pellets The sintered pellets have a specific gravity of between 2.7 and 3.4.

U.S. Pat. No. 4,522,731 to Lunghofer relates to an intermediate strength proppant having an alumina content between 40% and 60% which is produced using a spray agglomeration process and which has a density of less than 3.0 gr/cc. In a preferred embodiment Lunghofer produces his proppants from "Eufaula bauxite" which it states is bauxitic-kaolin type material deposited in and around Eufaula, Alabama. According to Lunghofer, the Eufaula bauxite preferably contains at least some (above 5%) gibbsite.

U.S. Pat. No. 4,668,645 to Khaund relates to an intermediate strength proppant made from a mined "bauxitic clay" having a specified chemical composition.

The proppants described in the Fitzgibbons, Lunghofer and Khaund patents have specific gravities lower than that of the earlier Cooke proppant and proppants having such lower specific gravities have been used with some success in intermediate depth wells where the stress on the proppant is in the 5,000 to 10,000 psi range. These lower specific gravity proppants, however, all have compressive strengths which are substantially lower than that of high specific gravity materials such as that referred to in the Cooke, et al. patent, which limits the conductivities and permeabilities that are obtained with such proppants, particularly at closure pressures over about 10,000 psi.

The conductivity of a proppant under specific conditions of stress, temperature, corrosive environment and time is the single most important measure of its quality. The conductivity of a packed proppant such as might be deposited in a fracture is defined as the permeability of the proppant pack multiplied by the width of the propped fracture and is usually stated in units of millidarci-feet ("md-ft").

The conductivity of currently available intermediate strength proppants is frequently measured by the tentative API 8 hour procedure, "Tentative Fifth Draft of Recommended Practices For Evaluating Short Term Proppant Pack Conductivity", (March 1987) (hereinafter the "API 8 hour Procedure"), which procedure is hereby incorporated by reference.

Recently a consortium of some twenty-eight organizations involved in various aspects of the fracturing and stimulation business has sponsored research on ways of evaluating and improving stimulation techniques. Stim-Lab, Inc. of Duncan, OK acts as the testing arm of the consortium to develop consistent and repeatable testing procedures for proppants including tests for determining their permeability and conductivity. The long term conductivity testing techniques developed by Stim-Lab have been widely accepted in the industry and are described in a publication of the Society of Petroleum Engineers, No. SPE 6900, entitled "An Evaluation of the Effects of Environmental Conditions and Fracturing Fluids on the Long-Term Conductivity of Proppants" by G. S. Penny of Stim-Lab, Inc., which publication is hereby incorporated by reference. It should be understood that any gap in the description in the SPE publication should be filled in by reference to the API 8 hour Procedure. The testing techniques used by the applicants to determine the conductivity of the proppants of the present invention as they are intended to be supplied to a customer (referred to as the "Stim-Lab Technique") are essentially identical to those described in SPE publication No. 16900 using Monel-K 500 shims in the conductivity cells. A single cell was used rather than stacking 4 cells in the manner described in the SPE publication. This however should have no effect on the measured results. The Stim-Lab Technique is considered to yield conductivity measurements that are repeatable to within about 5-10%.

SUMMARY OF THE INVENTION

In accordance with the invention there is provided a low density, high strength proppant which is formed of solid ceramic particles having a dry specific gravity between 2.65 and 3.0 and preferably between 2.65 and 2.85 and a conductivity of at least about 4000 md-ft and preferably at least 4400 md-ft after 50 hours at 8,000 psi and 275° F. in the presence of a deoxygenated 2% aqueous solution of KCl as measured by the Stim-Lab Technique. Most preferably the conductivity is at least 5500 md-ft as measured under the above conditions.

The proppant of the invention may be produced by milling or other comminuting calcined kaolin clay to an average agglomerated particle size of about 8 microns or less, and preferably of 5 microns or less, and pelletizing said powder in a compacting mixer. The kaolin clay is calcined at a temperature of less than 900° C. to reduce the loss on ignition ("LOI") to 12 w/o or less when tested at 1400° C. Applicants have found in accordance with the invention that it is important that the calcining be done at a low enough temperature that the kaolin clay does not undergo a phase transformation to mullite and crystobalite during such calcining.

Preferably, an organic binder is first dispersed in the milled kaolin clay in the mixer and then water is added to the powder at a controlled rate while mixing and compacting the powder to form rough pellets of a desired size. Next, with the mixer still running, additional dry, milled kaolin clay powder is slowly added to yield smooth, spherical pellets. The pellets are then dried and fired to convert the material to proppant pellets that preferably comprise between about 60 weight percent (hereinafter "w/o") and 85 w/o mullite, between about 15 w/o and 35 w/o crystobalite and a minor amount (less than 10 w/o) of a glassy phase and having a specific gravity of between 2.65 and 3.0.

The proppant of the present invention is mixed with a fluid and injected into a subterranean formation under high pressure to open a fracture, with the proppant remaining in the fracture to prop it open after the fracturing pressure is removed. Surprisingly and unpredictably, the measured conductivities of the proppants of the present invention are up to 100% higher than those of other known intermediate strength proppants, even ones which have higher specific gravities.

DETAILED DESCRIPTION

The preferred raw material for use in making the low specific gravity, high strength proppants of the present invention is kaolin clay. Preferably the kaolin clay consists largely of kaolinite ($Al_2Si_2O_5(OH)_4$) and is essentially free of sand (i.e., quartz). One source of such material is from the American Cyanamid Company in Andersonville, Ga. The Andersonville kaolin deposits owned by American Cyanamid are well described in a report by Alfred D. Zapp entitled "Bauxite Deposits of the Andersonville District, Ga.", U.S. Geological Survey Bulletin 1199-G. This report is incorporated herein by reference. The report states that the deposit consists largely of the mineral kaolinite and is essentially sand free. The chief impurities are compounds of iron and titanium and small amounts of gibbsite. The kaolin clay is deposited in tabular lenticular masses, the thicker of which may have cores of bauxite or bauxitic clay. Raw materials containing significant amounts of sand (free silica or quartz) produce a weaker proppant, while raw materials containing too much gibbsite or other hydrated aluminas yield a product having an undesirably high specific gravity. Another source of material believed to be suitable is the kaolin clay mined at the Mulcoa operations in Andersonville, Ga. of C. E. Minerals, headquartered in King of Prussia, Pa.

In general the kaolin clay most useful as a raw material in making the proppants in accordance with the invention may contain by chemical analysis between about 43 w/o to 58 w/o alumina, about 37 w/o to 52 w/o silica, less than 2 w/o (preferably less than 1 w/o) iron oxide and less than 5 w/o free quartz. Preferably, the kaolin clay comprises between 70 w/o and 90 w/o kaolinite, between 5 w/o and 25 w/o cryptocrystalline to amorphous gibbsite and less than 5 w/o other crystalline materials.

Preferably the amount of free quartz is less than 2 w/o and most preferably is non-detectable. Other naturally occurring minerals which may be present in minor or trace amounts include anatase and rutile. Minerals whose presence in the raw material appear to be somewhat detrimental to the properties of the final product include quartz, pyrite, marcasite, siderite, micas and montmorillonites.

The raw material is preferably calcined before further processing in order to remove water and organics. In accordance with the invention, applicants have found that the calcining should be performed at a temperature low enough that the kaolin clay does not undergo a phase change to form mullite or crystobalite. Applicants have found that the presence of any significant amount of mullite or crystobalite in the kaolin clay before the final drying and firing steps has a severely detrimental effect on the properties of the proppants produced. Therefore the calcining should be performed at a temperature below 900° C. for a sufficient time that the loss on ignition ("LOI") of the kaolinite is 12 w/o or less when tested at 1400° C. The calcining may be performed relatively quickly at temperatures on the order of 700° to 800° C. or may be performed more slowly at lower temperatures. If the calcining temperature is above about 450° to 500° C., the kaolinite is converted to amorphous alumina and silica (sometimes referred to as "meta kaolinite"). Such a transformation, however, has no adverse effect on the product of the invention.

The calcined material is then reduced in particle size, preferably by dry ball milling in a closed loop system containing a particle classifier. The average agglomerated particle size in this milled material should be about 8 microns or less, and preferably 5 microns or less, as measured by a Sedigraph (Micro Meritics Instrument Corp.) or a Granulometer' (Cilas Compagnie Industrielle des Lasars). The true ultimate particle size, however, of the milled raw material is much finer than 8 or 5 microns and is believed to be made up of submicron flakes. Such submicron flakes tend to agglomerate to form composite particles on the order of 8 microns or less which are sensed by the measuring instruments.

The milled raw material is pelletized in a compacting mixer. The preferred commercially available machines for this purpose are the Eirich Countercurrent Intensive Mixers which are manufactured in several sizes of different capacities by the Maschinenfabrik Gustav Eirich of Hardheim, West Germany and distributed in the United States by Eirich Machines, Inc., New York, N.Y.

The Eirich mixer has a rotating mixing pan forming the bottom of the mixing chamber which pan can be either horizontal or inclined at an angle and a "mixing star" which rotates in the opposite direction from the pan. The mixing star rotates about an axis parallel to and offset from that of the pan and has a diameter of about 20 to 25 percent of that of the pan. The preferred form of mixing star for the pelletizing operation is referred to by Eirich as a suction type rotor and has a plurality of vertically extending trapidzoidally shaped mixing elements which extend from the periphery of the rotating element. For the Model R7 machine, the pan has a single rotational speed of about 45 rpm, while the mixing star has a low and a high speed. The low speed is about 700 rpm and the high speed is about twice that, about 1400 rpm. The rotational speeds of the elements of the larger mixers are adjusted so that rotating elements have similar tip speeds. The mixer may also contain a second mixing star upon which can be mounted plows for cleaning the sides of the rotating pan. This second mixing star is also mounted eccentrically in the mixer and rotates in the opposite direction from the mixing pan. An example of another compacting mixer that is believed suitable for use in the present invention is the Littleford Lodige mixer.

The milled, calcined kaolin clay powder charge is preferably first mixed dry in the mixer with about to 2 w/o (calculated on the basis of the initial kaolin clay powder charge) of an organic binder such as a gelatinized cornstarch for a period of about 30 seconds with the suction rotor on the low speed setting in order to fully disperse the binder in the raw material powder.

It is preferred that such binders be such that they are pyrolized or driven off during later firing of the proppant pellets. The amount of the binder is normally on the order of 1 w/o to 2 w/o of the initial kaolin clay powder charge. It is possible to make pellets with the method of the invention without a binder but it is believed that the use of a binder results in improved properties and yield.

Next water is added at a controlled rate to the mixer with the suction rotor running at the low speed setting to initially pelletize the material. The rate of water addition should be controlled properly to facilitate the formation of the pellets in the mixer and can affect the quality of the final product. Typically the total amount of water for the Model R7 Eirich mixer is from about 32 to 40 w/o of the initial starting material and preferably about 35 to 40 w/o. Preferably between about 40 and 60 w/o of the expected total amount of water is added after the binder is dispersed and mixed for about 2 to 4 minutes. Thereafter additions of about 8 to 10% of the total water are made about every 0.75 to 1.5 minutes until irregularly shaped pellets ranging in size from about ⅛ to ¼ inch in diameter are formed.

Once pellets have formed in the mixer, which at this point are normally large and irregularly shaped, the suction rotor is switched to the high speed setting and additional milled calcined raw material (referred to as "dust") is slowly added to the mixer over a period of about 5 minutes in order to cause the pellets to become smaller, well shaped spheres of a narrower size distribution, typically 0.02 inches to 0.047 inches. Typically, the amount of dust required to form the desired size spheres is about 32 to 50 w/o of the starting raw material. Preferably about 40 to 45 w/o dust is added.

In some cases the suction rotor is switched back to the low speed setting for a later portion of the 5 minute period after a major portion of the dust has been added to the mixer. After adding the dust, the suction rotor is then preferably set back to the low speed setting if it has not already been and the mixer run for a further period of about 30 seconds in order to improve the sphericity of the pellets and to increase yield of the desired size range.

The amount and rate of water and dust additions to the mixer can have a significant impact on the conductivity of the proppant produced by the method of the invention. If too much water is added, the particles are poorly shaped and are too large. If the dust is added too quickly it results in a poor yield of particles in the desired size range. If not enough dust is added the particles are poorly shaped and will stick together in agglomerated masses. If too much dust is added the particles have a rough surface and unconsolidated dust remains in the mixer. When the right amount of dust is added, the process yields smooth, spherical, well compacted pellets. It has been found that mixing times towards the lower end of the above stated time ranges during the addition of water in the mixer tend to yield proppants having conductivities of about up to 30 percent higher than if the mixing times are towards the high end of those ranges.

The spherical pellets are next discharged from the mixer and dried to a free moisture content of less than 10% and preferably less than 5%. The drying temperature and time does not appear to be critical and it has been found, for instance, that drying at temperatures of 150° C. overnight, or of 260° C. for 10 to 15 minutes are suitable. Once dried, the desired size spherical pellets are separated by screening for instance to a 18/35 mesh size. The larger than 18 mesh and finer than 35 mesh are recycled to be repelletized. The screened particles in the desired size range are then sintered, for instance in a rotary kiln, at a temperature between 1300° and 1500° C., preferably between 1400° to 1470° C. for about 15 to 30 minutes at temperature. The total time in the kiln is normally from about 1 to ½ hours. The particles shrink upon firing by about 15% to 20%. The desired finished size is between 0.0167 inches and 0.0331 inches but can be larger or smaller as needed. The particular temperature to which the screened particles are fired is selected in order to maximize their strength. This temperature depends on several variables, some of which are the raw material mineralogy, the milled particle size, the pellet size and the volume of material in the kiln.

After firing, the pellets are again screened to the desired final size. A typical product size is 20/40 mesh which contains 90 w/o of its pellets of between 0.0167 inches and 0.0331 inches in size and preferably 90 w/o of the pellets between 0.0232 inches and 0.0331 inches in size.

Surprisingly and unexpectedly, it has been found that the proppants of the present invention have conductivities that are up to 100% higher than previously known intermediate strength proppants, even ones of higher specific gravities. The conductivities of the proppants of the preferred embodiment of the present invention are at least 4000 md-ft, and preferably at least 4400 md-ft, after 50 hours at 8000 psi and 275° F. in the presence of a deoxygenated 2% aqueous solution of KCl as measured by the Stim-Lab Technique. Most preferably the conductivity is at least 5500 md-ft when measured under the above conditions. The proppants of the preferred embodiment of the present invention have dry specific gravities of between 2.65 and 3.0 and preferably between 2.65 and 2.85.

For example, one proppant in wide commercial use which is believed to have been made by the method described in the above referred to Lunghofer patent from starting materials which are very similar to those referred to in that patent have been measured in accordance with the Stim-Lab Technique to have conductivities between 3,057 md-ft and 3700 md-ft after 50 hours at 275° F. and 8,000 psi in the presence of a deoxygenated aqueous 2% KCl solution. The proppants of the following Examples of the present invention, on the other hand, have conductivities between about 4080 md-ft and 6,878 md-ft depending on starting materials and processing conditions when measured under the same conditions.

While the reasons for the dramatically higher conductivities of the proppants of the present invention over those of the prior art are not fully understood, it is believed that they may relate in substantial part to a combination of factors such as the mineralogy and microstructure of the proppant pellets and to the fact that the proppant of the present invention is made from a nearly pure kaolinite raw material which has been calcined at low enough temperatures that it is not then converted to mullite and crystobalite and which has been milled to a fine particle size and then formed into pellets with compaction. In contrast, in the technique of the Lunghofer patent, the raw material is not calcined or milled prior to forming the pellets and the fluidized bed technique used to form the pellets does not provide any compaction during formation.

From a mineralogical point of view the sintered pellets of the preferred embodiment of the present invention are between about 60 w/o and 85 w/o mullite and between about 15 w/o and 35 w/o crystobalite and between about 0 w/o and 10 w/o of a glassy phase. It is believed that the glassy phase is best minimized for the highest quality product.

While the measured specific gravity of the above referred to commercially available proppant is slightly lower than the proppants of the present invention to which it was compared (2.70 vs. 2.80 to 2.90, respectively), this slight difference in density does not explain increases in conductivity of up to 100% and more. This is especially so in light of the fact that intermediate strength proppants such as Interprop Plus and Interprop 1 manufactured by the assignee of the present invention which have specific gravities of about 3.17, have been measured by the same technique to have conductivities of 3808 md-ft and 3269 md-ft, respectively. Thus, even though the proppant of the present invention has a specific gravity lower than that of the Interprop Plus and Interprop 1 proppants, its conductivity is up to more than 80% higher than Interprop Plus and 110% higher than Interprop 1. The Interprop Plus and Interprop 1 proppants are made with different raw materials but with a compacting mixer technique.

EXAMPLES

The invention is further illustrated by reference to the following non-limiting examples wherein all percentages are by weight unless otherwise specified. All of the raw materials have been calcined at a temperature of 480° C. for a period of approximately 24 hours to an LOI of between 11.0 and 12.1 when tested at 1400° C., and have been ball milled in a Conical closed circuit ball mill with a gyrotor air classifier manufactured by Mineral Processing Systems, Inc. in York, Pa. Unless otherwise indicated, the pellets are screened to an 18/35 mesh size after drying and to a 20/30 mesh size after sintering wherein 90% of the pellets are between 0.0232 inches and 0.0331 inches in size. The typical yield of properly sized pellets in the first screening is about 70%. The chemical compositions of the calcined kaolin clay powders used as raw materials in Examples 1–4 are summarized in Table I. The mineralogical composition of such raw materials as measured by the X-ray diffraction tecnhique is summarized in Table II. It should be noted that in addition to the components listed in Table II, the raw material powders also contain cryptocrystalline to amorphous gibbsite and perhaps other non-crystalline materials which are not detected by the X-ray diffraction technique. In the components in Table II which divide into major minerals which comprise about 95 w/o of the detected minerals present and the minor minerals which together make up less then 5 w/o of the detected minerals present. The amount of gibbsite present can be determined from Table II since in all but Example 3 the amount of $SiO_2$ present as free quartz is non-detectable so that any $Al_2O_3$ present which is not part of the kaolinite is believed to be in the form of cryptocrystalline to amorphous gibbsite. Kaolinite is approximately 45 w/o $Al_2O_3$.

TABLE I

| Chemistry | Example | | | |
|---|---|---|---|---|
| | 1 | 2 | 3 | 4 |
| $Al_2O_3$ | 57.14 | 57.14 | 48.76 | 49.29 |
| $SiO_2$ | 38.66 | 38.66 | 47.76 | 48.70 |
| $Fe_2O_3$ | 1.19 | 1.19 | .94 | .90 |
| $TiO_2$ | 2.82 | 2.82 | 2.18 | 1.95 |
| CaO | .08 | .08 | .07 | .03 |
| MgO | .03 | .03 | .03 | .03 |
| $Na_2O$ | .04 | .04 | .12 | .04 |
| $K_2O$ | .04 | .04 | .14 | .06 |

TABLE II

| Mineralogy | Example | | | |
|---|---|---|---|---|
| | 1 | 2 | 3 | 4 |
| Major Minerals | | | | |
| Kaolinite | Major | Major | Major | Major |
| Quartz | ND | ND | Minor | ND |
| Gamma $Fe_2O_3$ | ND | ND | ND | Trace |
| Minor Minerals | | | | |
| Anatase | Major | Major | Trace | Minor |
| Rutile | Trace | Trace | Trace | 0 |

Where 'ND' means non-detectable

EXAMPLE I

A 50 lb. charge of milled, calcined kaolin clay obtained from the American Cyanamid, Andersonville, Ga. deposits and having the chemical and mineralogical composition indicated in Tables I and II was placed in an Eirich Model R7 Compacting Mixer having an inclined pan and a suction type rotor along with 1 lb. of gelatinized cornstarch binder and mixed for 30 seconds with the suction rotor in its low speed setting in order to fully disperse the binder in the kaolin clay powder. With the suction rotor rotating at its low speed setting, 9 lbs. of water was added to the mixer and mixed for a period of two minutes. As the suction rotor continued to operate in the low speed setting, four 2 lb. additions, followed by two 1 lb. additions and a ½ lb. addition of water were added sequentially to the mixer with a 45 second mixing period after each addition. At this point irregularly shaped pellets had formed.

The rotor was then switched to the high speed setting and an additional 12 lbs. of the same milled, calcined kaolin clay powder was slowly added to the mixer over a three minute period. Then the rotor was reset to its low speed setting and additional 6 lbs. of the kaolin clay powder was added over a period of two minutes. The mixing was continued with the suction rotor in the low speed setting for an additional period of 30 seconds. At this point the particles had fairly good sphericity but had rather rough surfaces. An additional 2 ½ lbs. of the kaolin clay powder were slowly added to the mixer over a 1 minute period and the material mixed for an additional 30 seconds with the suction rotor continuing in the low speed setting. The pellets now had a good spherical shape and smooth surfaces. The pellets were discharged from the mixer and dried overnight at 150° C. in a box oven. After drying the pellets were screened to an 18/35 mesh and fired at 1470° C. in a rotary kiln for a period of about 30 minutes at temperature with a total time in the kiln of approximately 1 hour 15 minutes. After cooling the pellets were screened to a 20/30 mesh. The dry specific gravity of the material was 2.90 as measured by a Beckman air comparison pycnometer Model 930.

A conductivity test using the Stim-Lab Technique referred to above was conducted with final closure stress of 8,000 psi at 275° F. in the presence a deoxygenated aqueous 2% solution of KCl for 50 hours. In accordance with this procedure 63.06 grams of the screened proppant pellets were loaded into a API Hasteloy-C 10 in² linear flow cell to give a loading of 2 lbs./ft² of proppant and leveled loosely with a universal bevel blade device. A 0.030″ thick Monel shim was placed on top of the test pack followed by an O ring fitted to a piston which was lightly coated with vacuum grease. The loaded test cell was then placed in a 150 ton Dake press and the closure stress was increased to 500 psi at a rate of 100 psi/min. The cell was saturated with deoxygenated aqueous 2 w/o KCl solution and then purged of air at the ambient laboratory temperature of 70° F. to 80° F. A Validyne DP15-30 differential pressure transducer connected across the cell was calibrated with water columns to 0.0001 psi accuracy. Closure stress was then raised to 1,000 psi at a rate of 100 psi/min. A Reservoir Accumulator, made up of two 5 gal and two 1 gal nitrogen driven fluid reservoir accumulators which were filled with a 2 w/o KCl aqueous solution that had been deoxygenated with nitrogen to a level of less than 15 ppb and preferably less than 5 ppb of oxygen was connected to the test cell and set at a driving pressure of 400 psi. The connection of the Reservoir Accumulator to the cell is make through two 150ml sample cylinders filled with 100 mesh Oklahoma #1 sand with ceramic band heaters in order to saturate the test fluid with silica. It should be noted that the closure stresses on the proppant pack in the cell are stated in terms of the net closure stress on the pack which is equal to the gross pressure applied by the press minus the 400 psi pressure applied by the reservoir accumulator.

The system was allowed 30 minutes to come to equilibrium and a series of five conductivity measurements were taken and averaged. The conductivity was calculated from the darci relationship:

$$k_{wf} = 26.78 \, \mu Q / \delta P \text{ where}$$

$k_{wf}$ = Conductivity (md-ft)

26.78 = factor to account for a 1 ½ × 5 inch flow area and pressure in psi
$\mu$ = Viscosity of flowing fluid at temperature (cp)
Q = Flow rate (ml/min)
$\delta P$ = Pressure differential across 5 inch flow path.

After the readings were taken at ambient temperature, the temperature was increased to 275° F. and held for 8 hours for temperature uniformity. Next readings with the system at 275° F. were taken at 1,000 psi, 2,000 psi, 4,000 psi, 6,000 psi and 8,000 psi with the closure stress being raised between levels at a rate of 100 psi/min. After reaching each of the 1,000, 2,000, 4,000 and 6,000 closure stress levels, the system was held at 275° F. for 1.5 hours before the conductivity readings were taken. At the 8,000 psi level the cell was held at 275° F. for 50 hours during which conductivity measurements were taken at 10 hour intervals. The measured conductivity at the 50 hour time was 6,247 md-ft.

EXAMPLE II

The same Stim-Lab conductivity test procedure described in Example I was repeated on proppant particles made in Example I. This time the measured conductivity at the 50 hour time was 6,878 md-ft.

EXAMPLE III

In this example kaolin clay, designated as SR105 Stardis, obtained from Alcoa Corporation and having the chemical and mineralogical composition indicated in Tables I and II was utilized. A 50 lb. charge of milled, calcined kaolin clay was placed in the Eirich Model R7 Compacting Mixer described in Example I along with 1 lb. of cornstarch binder and mixed dry for 30 seconds at the low speed setting. Water was then added to the mixer with the mixer operating at the low speed setting with 9 lbs. being added and mixed for 4 minutes followed by 4 additions of 2 lbs. each and a final addition of ½ lb., with 1.5 minute mixing period after each addition.

The mixer was then set to the high speed mode and 1 lbs. of the same milled, calcined kaolin clay powder was slowly added to the mixer over a 3 minute period. The mixer was then switched back to the low speed setting and an additional 7 lbs. of the same kaolin clay powder was slowly added over a 2 minute period, followed by a 30 second low speed mixing. An additional 3 ½ lbs. of the same kaolin clay powder was added over the following minute followed by an additional 30 second mixing period at the low speed. Then a final 3 lbs. of the kaolin clay powder was added over the following minute. The particles were thereafter discharged from the mixer and screened, dried and fired in the same manner as described in Example I with the exception that the sintering temperature was 1420° C. After cooling the pellets were screened to a 20–30 mesh size. The dry specific gravity of the material ws 2.80. The Stim-Lab conductivity test described in connection with Example I was then performed yielding a measured conductivity after 50 hours at 8,000 psi and 275° F. of 4,080 md/ft.

EXAMPLE IV

A 50 lb. charge of milled, calcined kaolin clay obtained from the American Cyanamid Andersonville, Ga. deposits having the chemical and mineralogical composition indicated in Tables I and II was placed in the Eirich Model R7 Compacting Mixer described in Example I along with 1 lb. of the cornstarch binder and mixed with water in the same manner as described in Example I with the exception that the final ½ lb. addition of water was eliminated so that only 19 lbs. of water was added to the mixer. At that point the powder had formed into slightly wet looking somewhat irregularly shaped pellets.

Next the mixer was switched to the high speed setting and 15 lbs. of the same milled, calcined kaolin clay powder was slowly added over a 3 minute period. Next the mixer was switched back to the low speed setting and an additional 7 ½ lbs. of the kaolin clay powder was added over the following 2 minutes after which the mixer continued to be operated for an additional 30 second period. The pellets formed by the mixer were slightly larger than desired but were still quite usable. The pellets were then removed from the mixer and dried, screened (both before and after sintering) and sintered in the same manner as described in Example I with the exception that the sintering temperature used was 1,420° C.

The Stim-Lab conductivity test described in Example I was then performed on the proppant resulting in a conductivity measurement of 5,379 md-ft. after 50 hours at 8,000 psi at 275° F. The dry specific gravity of the proppant was 2.81.

The low density high strength proppant particles of the present invention may be injected into fractures in subsurface formation as a propping agent to increase oil or gas production from the well. In fracturing treatment a viscous fluid, often referred to as a "pad" is injected into the well at extremely high pressure to cause the formation to fail in tension and fracture to accept the fluid. The fracturing fluid may be an oil base, water base, acid, emulsion, foam or other fluid. Normally the fluid contains several additives such as viscosity builders, drag reducers, fluid loss additives, corrosion inhibitors, cross linkers and the like. The fluid of the pad is injected until a fracture of sufficient geometry is obtained to permit the placement of the proppant pellets. Normally the treatment is designed to provide a fracture at the well bore of at least 2 ½ times the diameter of the largest proppant pellet. Once a fracture of the desired geometry is obtained, the proppants are carried suspended in the fluid pad and placed in the fracture. Following placement of the proppant, the well is shut-in for an amount of time sufficient to permit the pressure to bleed off into the formation which in turn causes the fracture to close and exert closure stress on the proppant particles. The shut-in period may vary from a few minutes to several days. The proppant particles of the present invention are particularly suitable for use as propping agents in wells of depths less than about 14,000 feet.

What is claimed is:

1. A low density, high strength proppant comprising solid ceramic pellets consisting essentially of a sintered kaolin clay and having a dry specific gravity of 3.0 or less, said kaolin clay having an alumina content of about 58% or less, said proppant having a conductivity of at least 4,400 md-ft after 50 hours at 8,000 psi and 275° F. in the presence of a deoxygenated aqueous 2% solution of KCl as measured by the Stim-Lab Technique.

2. The proppant of claim 1 wherein said pellets have a specific gravity between 2.65 and 3.0.

3. The proppant of claim 2 wherein the pellets have a specific gravity between 2.65 and 2.85.

4. The proppant of claim 1 wherein said conductivity is at least 5500 md-ft.

5. The proppant of claim 2 wherein said conductivity is at least 5500 md-ft.

6. The proppant of claim 3 wherein said conductivity is at least 5500 md-ft.

7. The proppant of claim 1 wherein said kaolin clay is calcined at a temperature below that which would cause the transformation of any significant portion of said kaolin clay to mullite or crystobalite for a time sufficient to reduce the LOI thereof to 12% or less when tested at 1400° C.

8. The proppant of claim 7 wherein said pellets are produced by adding water to said kaolin clay after calcining while simultaneously mixing and compacting it to form pellets therefrom in a desired size range and drying and sintering said pellets.

9. The proppant of claim 8 wherein said mixing and compacting comprise the steps of:
pelletizing an initial amount of milled, calcined kaolin clay powder by simultaneously mixing and compacting said powder while adding water at a controlled rate, and
adding additional amounts of said powder at a controlled rate while continuing said simultaneous mixing and compacting to form pellets therefrom in a desired size range.

10. The proppant of claim 9 wherein said step of pelletizing further includes dispersing an organic binder in said powder prior to adding water.

11. The proppant of claim 9 wherein the amount of water added is between 32 w/o and 40 w/o of the initial amount of said powder.

12. The proppant of claim 9 wherein the additional amounts of said powder added subsequent to adding said water is between 35 w/o and 50 w/o of the initial amount of said powder.

13. A low density, high strength proppant comprising solid ceramic sintered pellets having a dry specific gravity of 3.0 or less produced by the steps of:
pelletizing a milled, calcined kaolin clay powder which is substantially free of mullite and crystobalite by simultaneously mixing and compacting said powder while adding water at a controlled rate, and adding additional amounts of said powder at a controlled rate while continuing said mixing to form pellets therefrom in a desired size range; and drying and sintering said pellets.

14. The proppant of claim 13 wherein the pellets have a dry specific gravity of between 2.65 and 2.85.

15. A low density, high strength proppant comprising solid ceramic pellets, said pellets consisting essentially of a sintered kaolin clay having a dry specific gravity of 3.0 or less, said proppant having a conductivity of at least 4,400 md-ft after 50 hours at 8,000 psi and 275° F. in the presence of a deoxygenated aqueous 2% solution of KCl as measured by the Stim-Lab Technique, said kaolin clay having been calcined before compaction at a temperature below that which would cause the transformation of any significant portion of said clay to mullite or crystobalite for a time sufficient to reduce the LOI of said clay to 12% or less when tested at 1400° C.

16. The proppant of claim 15 wherein the dry specific gravity of said pellets is between 2.65 and 2.85.

17. The proppant of claim 15 wherein said conductivity is at least 5,500 md-ft.

18. The proppant of claim 15 wherein said pellets contains less than about 10% of a glassy phase and less than about 2% iron oxide.

19. A low density, high strength proppant comprising solids ceramic pellets consisting essentially of mullite and crystobalite, said pellets containing less than about 10% of a glassy phase, said proppant having a dry specific gravity of 3.0 or less and a conductivity of at least 4,400 md-ft after 50 hours at 8,000 psi and 275° F. in the presence of a deoxygenated aqueous 2% solution of KCl as measured by the Stim-Lab Technique.

20. The proppant of claim 19 wherein said pellets contain between 60 and 80 w/o mullite and between about 15 and 35 w/o crystobalite.

* * * * *